(12) United States Patent
Nickel

(10) Patent No.: US 11,457,642 B2
(45) Date of Patent: Oct. 4, 2022

(54) FORMULATIONS FOR USE IN FOOD PRODUCTS

(71) Applicant: Aladdin Foods, LLC, Laguna Beach, CA (US)

(72) Inventor: Gary B. Nickel, Eden Prairie, MN (US)

(73) Assignee: ALADDIN FOODS, LLC, Laguna Beach, CA (US)

( * ) Notice: Subject to any disclaimer, the term of this patent is extended or adjusted under 35 U.S.C. 154(b) by 297 days.

(21) Appl. No.: 14/866,772

(22) Filed: Sep. 25, 2015

(65) Prior Publication Data

US 2016/0088849 A1   Mar. 31, 2016

Related U.S. Application Data

(60) Provisional application No. 62/055,624, filed on Sep. 25, 2014.

(51) Int. Cl.
| | | |
|---|---|---|
| A23C 9/152 | (2006.01) | |
| A21D 10/00 | (2006.01) | |
| A21D 2/26 | (2006.01) | |
| A21D 2/18 | (2006.01) | |
| A23C 9/154 | (2006.01) | |
| A21D 13/80 | (2017.01) | |
| A23C 9/156 | (2006.01) | |

(52) U.S. Cl.
CPC .............. *A23C 9/152* (2013.01); *A21D 2/186* (2013.01); *A21D 2/263* (2013.01); *A21D 10/002* (2013.01); *A21D 13/80* (2017.01); *A23C 9/154* (2013.01); *A23C 9/156* (2013.01); *A23C 9/1544* (2013.01); *A23V 2002/00* (2013.01)

(58) Field of Classification Search
CPC ....... A23C 9/1544; A23C 9/152; A23C 9/156; A23C 9/154; A21D 13/08; A21D 2/186; A21D 2/263; A21D 10/002; A21D 13/80
USPC .................................................. 426/540, 573
See application file for complete search history.

(56) References Cited

U.S. PATENT DOCUMENTS

| | | | |
|---|---|---|---|
| 2,557,091 A | 6/1951 | Gamrath et al. | |
| 2,876,160 A | 3/1959 | Schoch et al. | |
| 3,479,191 A | 11/1969 | Morton | |
| 3,557,091 A | 1/1971 | Martin et al. | |
| 3,839,320 A | 10/1974 | Bauer | |
| 3,974,034 A | 8/1976 | Horn et al. | |
| 4,048,435 A | 9/1977 | Rutenberg et al. | |
| 4,135,004 A | 1/1979 | Finkel | |
| 4,187,326 A * | 2/1980 | Serafino | A23L 2/00 426/590 |
| 4,192,783 A | 3/1980 | Bomball et al. | |
| 4,308,294 A | 12/1981 | Rispoli et al. | |
| 4,430,356 A | 2/1984 | Ohyabu et al. | |
| 4,479,973 A * | 10/1984 | Holley | A23C 9/1544 426/573 |
| 4,499,116 A | 2/1985 | Zwiercan et al. | |
| 4,501,888 A | 2/1985 | Schmidt | |
| 4,510,166 A * | 4/1985 | Lenchin | A23G 9/32 127/29 |
| 4,608,265 A | 8/1986 | Zwiercan et al. | |
| 4,695,475 A | 9/1987 | Zwiercan et al. | |
| 4,840,807 A | 6/1989 | Yoshida | |
| 4,937,091 A | 6/1990 | Zallie et al. | |
| 4,971,723 A | 11/1990 | Chiu | |
| 4,977,252 A | 12/1990 | Chiu | |
| 4,980,193 A * | 12/1990 | Tuason, Jr. | A23G 1/56 426/573 |
| 5,019,414 A * | 5/1991 | Valdes | A23G 9/42 426/573 |
| 5,164,215 A | 11/1992 | Furcsik et al. | |
| 5,185,176 A | 2/1993 | Chiu | |
| 5,200,216 A | 4/1993 | Barz et al. | |
| 5,244,687 A | 9/1993 | Rybinski et al. | |
| 5,321,132 A | 6/1994 | Billmers et al. | |
| 5,378,491 A | 1/1995 | Stanley et al. | |
| 5,380,543 A | 1/1995 | Barz et al. | |
| 5,385,688 A * | 1/1995 | Miller | C09K 5/20 252/70 |
| 5,478,587 A * | 12/1995 | Mingione | A23G 9/04 426/565 |
| 5,523,111 A | 6/1996 | Nickel | |
| 5,567,464 A | 10/1996 | Barz | |
| 5,584,937 A | 12/1996 | Finocchiaro | |
| 5,629,090 A | 5/1997 | Eastman | |
| 5,679,396 A | 10/1997 | Finnocchiaro | |
| 5,681,598 A | 10/1997 | Kuraishi et al. | |
| 5,703,226 A | 12/1997 | Nickel et al. | |
| 5,711,986 A | 1/1998 | Chiu et al. | |
| 5,755,890 A | 5/1998 | Yuan | |

(Continued)

FOREIGN PATENT DOCUMENTS

NL          93354          2/1960

OTHER PUBLICATIONS

NPL modified Cellulose (Retrieved on Nov. 6, 2020). (Year: 2020).*
NPL Modified cellulose (Retrieved on May 20, 2021 See first paragraph , first page of 27 pages) (Year: 2021).*
Udomrati, et al., "Enzymatic esterification of tapioca maltodextrin fatty acid ester", Carbohydrate Polymers, (ePub. Aug. 14, 2013), 99, doi: 10.1016/j.carbpol.2013.07.081, Jan. 2, 2014, 379-384.
Zheng, et al., "Effect of cross-linking and esterification on hygroscopicity and surface of cassava maltodextrins", J. Food Chem. 2007 (ePub Dec. 13, 2006), 103(4), doi: 10.1016/j.foodchem.2006. 10.053, 1375-1379.
Derradji-Serghat, "abstract", Starke, 1999, vol. 51, No. 10, p. 362-368.
Duoma, et al., ""Butter" webexhibits.org archived online Nov. 27, 2003, 3 pages", Nov. 27, 2003.

(Continued)

*Primary Examiner* — Donald R Spamer
*Assistant Examiner* — Bhaskar Mukhopadhyay
(74) *Attorney, Agent, or Firm* — Billion & Armitage

(57) ABSTRACT

The invention provides formulations for use in food products. The formulations provided herein are comprised of stabilizers, including modified food starches, sweeteners, dairy or non-dairy products, and optionally flavorings, and colorings. The formulations can be used in dessert food products, especially in tres leches cakes.

8 Claims, No Drawings

(56) References Cited

U.S. PATENT DOCUMENTS

| | | | |
|---|---|---|---|
| 5,807,601 A | 9/1998 | Carpenter et al. | |
| 5,866,180 A | 2/1999 | Budolfsen et al. | |
| 5,882,713 A | 3/1999 | Eskins et al. | |
| 5,904,949 A | 5/1999 | Reddy et al. | |
| 5,925,398 A | 7/1999 | Rizvi | |
| 6,054,302 A | 4/2000 | Shi et al. | |
| 6,060,107 A | 5/2000 | Reddy | |
| 6,086,926 A | 7/2000 | Bruce et al. | |
| 6,093,424 A | 7/2000 | Han et al. | |
| 6,093,439 A * | 7/2000 | Whaley | A23C 9/137 426/549 |
| 6,096,524 A | 8/2000 | Shi et al. | |
| 6,113,953 A | 9/2000 | McMahon | |
| 6,197,362 B1 * | 3/2001 | Hussein | A23C 9/1544 426/585 |
| 6,224,914 B1 | 5/2001 | Han et al. | |
| 6,228,419 B1 | 5/2001 | Yuan et al. | |
| 6,242,035 B1 * | 6/2001 | Clark | C08B 37/0024 426/573 |
| 6,258,390 B1 | 7/2001 | Budtz | |
| 6,270,814 B1 | 8/2001 | Han et al. | |
| 6,319,526 B1 | 11/2001 | Dahlstrom et al. | |
| 7,550,279 B2 | 6/2009 | Nickel | |
| 2003/0007984 A1 * | 1/2003 | Euverink | B01J 13/0065 424/401 |
| 2003/0091721 A1 * | 5/2003 | Ohta | A23L 27/50 426/648 |
| 2005/0025872 A1 * | 2/2005 | Joseph | A23D 7/011 426/601 |
| 2005/0069992 A1 * | 3/2005 | Nickel | A23C 15/12 435/101 |
| 2005/0153046 A1 * | 7/2005 | Robert | A23C 9/1544 426/573 |
| 2006/0204569 A1 * | 9/2006 | Obae | A23L 1/0522 424/464 |
| 2007/0110869 A1 * | 5/2007 | Horstman | A21D 13/41 426/549 |
| 2007/0172548 A1 * | 7/2007 | Cale | A23C 1/16 426/36 |
| 2009/0068334 A1 | 3/2009 | Hussein | |
| 2010/0278994 A1 * | 11/2010 | Klemaszewski | A23C 9/137 426/579 |
| 2012/0189751 A1 * | 7/2012 | Beinecke | A23L 19/13 426/574 |

OTHER PUBLICATIONS

Erdi, et al., "Rheological Characteristics of Polymeric Microcrystal-Gels", Journal of Colloid and Interface Science, vol. 28, No. 1, Sep. 1968, pp. 37-46.
Fats and Fatty Oils, "Fats and Fatty Oils", vol. 9, pp. 795-810.
Food Engineering, "New Generation of Foods with Reduced Fat", Jan. 1990, pp. 23-24.
Food Science, "Heat Preservation and Processing", pp. 199-201.
Food Technology, "Membrane Separation Technology Offers Processors unlimited Potential", Sep. 1990, pp. 108-113.
Food Technology, "Oat-Bran-Based Ingredient Blend Replaces Fat in Ground Beef and Pork Sausage", Nov. 1991, pp. 60-66.
Food Technology, "The Interfacial Key to Emulsion Stability", Oct. 1988, pp. 172-186.
Galliard, et al., "Morphology and composition of starch", In Starch: Properties and Potential, Galliard, T. Ed.; John Wiley & Sons, 1987, Chapter 3, pp. 55-78.
Ghiasi, et al., "Effects of Flour Components.and Dough Ingredients on Starch Gelatinization", Cereal Chemistry, 1982, 60 (1): 58-61.
Whistler, et al., "Effect of Acid Hydrolysis on RD the R~trogradation of Amylose", Effect of Acid Hydrolysis on Amylose, vol. 25, Nov. 1948, pp. 418-424.
Whistler, et al., "Molecular Structure of Starch", In Starch: Chemistry and Technology, 2nd ed., Whistler, R. L. et al. Ed.; Academic Press, Inc., 1984, Chapter VI, pp. 153-182.
Willhoft, et al., "Recent Developments on the Bread Staling Problem", The Bakers Digest, Dec. 1973, pp. 14-20.
Wong, et al., "Emulsions", vol. 9, pp. 393-412.
Wurzburg, "Modified Starches: Properties and Uses", Converted Starches, pp. 17-33.
Wurzburg, "Properties and Uses of Starch Types", Modified Starches: Properties and .Uses, pp. 244-252.
Young, et al., "Fractionation of Starch", In Starch: Chemistry and Technology, 2nd ed.; Whistler, R. L. et al. Ed.; Academic Press, Inc., 1984, Chapter VIII, pp. 249-283.
International Search Report and Written Opinion for International Application No. PCT/US2015/052481 dated Dec. 15, 2015, 9 pages.
Battista, et al., "Colloidal Macromolecular Phenomena", Journal of Applied Polymer Science, vol. II, (1967). pp. 481-498.
Battista, et al., "Microcrystalline Cellulose", Industrial and Engineering Chemistry,vol. 54, No. 9' Sep. 1962, pp. 20-29.
Bouchard, "High-Performance Liquid Chromatographic Monitoring of Carbohydrate Fractions in Partially Hydrolyzec Corn Starch", J. Agric. Food Chem., 1988, 36, pp. 1188-1192.
Giese, "Developing Low-Fat Meat Products", Food Technology, Apr. 1992, pp. 100-108.
Gros, et al., "Properties of the Fatty Acid Esters of Amylose", JAOCS, Jan. 1962, vol. 39, pp. 19-24.
Horton, et al., Selective 6-)-Acetylation of Amylose, Carbohydrate Research, Mar. 1978, 61(1),, 553-556.
Jane, et al., "Preparation and Properties of Small-Particle Corn Starch", Cereal Chemistry, 1992, 69(3) :280-283.
Jane, et al., "Structure Studies of Amylose-v Complexes and Retrograded Amylose by Action of Alpha Amylases, and a New Method for Preparing Amylodextrins", Carbohydrate Research, 132 (1984). pp. 105-118.
Kennedy, "Structured Lipids: Fats of the Future", Food Technology, Nov. 1991, pp. 76-79.
Kwak, et al., "Removal of Cholesterol from Cheddar Cheese by B-Cyclodextrin", J. Ag. Food Chem., Nov. 7, 2002, vol. 50, pp. 7293-7298.
Larsson, et al., "Annealing of Starch at an Intermediate Water Content", Starch, 43 Nr 6, s. pp. 227-231, 1991.
Manners, "Recent Developments in our Understanding of Amylopectin Structure", Carbohydrate Polymers 1989, vol. 11, 87-112.
Mathews, et al, Figure 9.20: alpha-amylose helix, Biochemistry, 2nd Edition, 1996, 1 page.
Mussulman, et al., "Electron Microscopy of unmodified and Acid-Modified Corn Starches", Corn Starch Electron Microscopy, vol. 45, Mar. 1968, pp. 162-171.
Nara, "Study on Relative Crystallinity of Moist Potato Starch", Starch 30, Nr. 4, s. (1978), pp. 111-114.
Richardson, "Molecular Mobilities of Instant Starch Gels Determined by Oxygen-17 and Carbon-13 Nuclear Magnetic Resonance", Journal of Food Science, vol. 53, No. 4, 1988, pp. 1175-1180.
Russell, et al., "Characterisation of Resistant Starch from Wheat and Maize", Journal of cereal Science 9, (1989). pp. 1-15.
Savage, et al., "Effects of Certain Sugars and Sugar Alcohols on the Swelling of Cornstarch Granules", The American Association of Cereal Chemists, 1978, 55(4) :447-454.
Seon, et al., "The accelerated ripening of cholesterol-reduced Cheddar cheese by crosslinked B-cyclodextrin", J. Dairy Sci., 2009, 92(1 ), pp. 49-57.
Shannon, et al., "Genetics and Physiology of Starch Development,", Starch 2nd Edition, Chapter III, 1984, pp. 25-59.
Sievert, et al., "Enzyme-Resistant Starch . I. Characterization and Evaluation by Enzymatic, Thermoanalytical, and RD Microscopic Methods", American Association of Cereal Chemists. Inc., 1989, 66 (4): 342-347.
Spies, et al., "Effects of Sugars on Starch Gelatinization", Cereal Chemistry, 59 (2): 128-131, 1982.
Taki, "Functional Ingredient Blend Produces Low-Fat Meat Products to Meet Consumer Expectations", Food Technology, Nov. 1991, pp. 70-74.

(56) References Cited

OTHER PUBLICATIONS

Torres, et al., "Polydextrose . . . and its Applications in Foods", Food Technology, Jul. 1981, pp. 44-57.

* cited by examiner

FORMULATIONS FOR USE IN FOOD PRODUCTS

BACKGROUND

Mixtures of dairy and non-dairy components for incorporation into food products are known in the food industry. These food products include nutritious drink mixes and dessert cakes such as a sponge cake soaked with a blend of three milks and then decorated with a topping. One such dessert product is frequently marketed under the name of "Tres Leches" or similar. The dairy mix for such dessert products is prepared through laboriously blending three milk products. However, such dairy mixes are difficult to prepare and require maintaining fresh inventory of the separate components, leading to storage and sanitary problems.

Therefore, good tasting food products that are economical and pleasing to the consumer are needed.

SUMMARY

The invention provides formulations for use in food products. The formulations provided herein are mixtures of an amount of one or more sweeteners, an amount of one or more dairy or non-dairy components, and an amount of one or more stabilizers, including hydrated modified food starch gel as one stabilizer. The formulations optionally include an amount of one or more flavorants, or an amount of one or more colorants, or a combination thereof.

In an embodiment, provided is a formulation for use in food products, comprising a mixture of about >2.0 wt % to about 30 wt % of one or more stabilizers, wherein at least one stabilizer is a modified food starch gel, about 50 wt % to about 85 wt % of one or more dairy or non-dairy components, and about 5 wt % to about 30 wt % of an amount of one or more sweeteners.

In another embodiment, a formulation is provided for use in food products, comprising a mixture of about >2.0 wt % to about 30 wt % of one or more stabilizers, wherein at least one stabilizer is a modified food starch gel, about 50 wt % to about 85 wt % of one or more dairy or non-dairy components, and about 5 wt % to about 30 wt % of an amount of one or more sweeteners, wherein the modified food starch gel is hydrated and is comprised of approximately 16-24% solids.

In a further embodiment, a formulation is provided for use in food products, comprising a mixture of about >2.0 wt % to about 30 wt % of one or more stabilizers, wherein at least one stabilizer is a modified food starch gel, about 50 wt % to about 85 wt % of one or more dairy or non-dairy components, and about 5 wt % to about 30 wt % of an amount of one or more sweeteners, where the modified food starch gel is hydrated and is in the formulation in an amount from about >2 wt % to about 20 wt %.

In another embodiment, a formulation is provided for use in food products, comprising a mixture of about >2.0 wt % to about 30 wt % of one or more stabilizers, wherein at least one stabilizer is a modified food starch gel, about 50 wt % to about 85 wt % of one or more dairy or non-dairy components, and about 5 wt % to about 30 wt % of an amount of one or more sweeteners, wherein the modified food starch gel is dried and is comprised of approximately 3-5% solids.

Additional embodiments provide a formulation for use in food products, comprising a mixture of about >2.0 wt % to about 30 wt % of one or more stabilizers, wherein at least one stabilizer is a modified food starch gel, about 50 wt % to about 85 wt % of one or more dairy or non-dairy components, and about 5 wt % to about 30 wt % of an amount of one or more sweeteners, wherein the modified food starch gel is dried and is in the formulation in an amount from about >2 wt % to about 5 wt %.

In another embodiment, a formulation is provided for use in food products, comprising a mixture of about >2.0 wt % to about 30 wt % of one or more stabilizers, wherein at least one stabilizer is a modified food starch gel, about 50 wt % to about 85 wt % of one or more dairy or non-dairy components, and about 5 wt % to about 30 wt % of an amount of one or more sweeteners, wherein dried modified food starch gel is hydrated and is in the formulation in an amount from about >2 wt % to about 20 wt %. The dried modified food starch gel is hydrated with water.

According to certain embodiments, the stabilizers in the formulations are hydrated modified food starch gel, carrageenan, maltodextrin, cellulose gum, modified cellulose, or a combination thereof. In other embodiments, the one or more stabilizers of the formulation are carrageenan, maltodextrin, cellulose gum, or modified cellulose, or a combination thereof, and said stabilizers are in the formulation in an amount from about 0.10 wt % to about 10 wt %.

In still other embodiments, a formulation is provided for use in food products, comprising a mixture of about >2.0 wt % to about 30 wt % of one or more stabilizers, wherein the stabilizers comprise hydrated modified food starch gel, carrageenan, maltodextrin, cellulose gum, and modified cellulose, about 50 wt % to about 85 wt % of one or more dairy or non-dairy components, and about 5 wt % to about 30 wt % of an amount of one or more sweeteners.

In other embodiments, a formulation is provided for use in food products, comprising a mixture of about >2.0 wt % to about 30 wt % of stabilizers, wherein >2 wt % to about 20 wt % of the total amount of stabilizer in the formulation is hydrated modified food starch gel, and wherein about 0.10 wt % to about 10 wt % of the total amount of stabilizer in the formulation is carrageenan, maltodextrin, cellulose gum, or modified cellulose, or a combination thereof, and about 50 wt % to about 85 wt % of one or more dairy or non-dairy components, and about 5 wt % to about 30 wt % of an amount of one or more sweeteners.

In certain embodiments, the dairy components of the formulations are cream, crème, whole milk, half-and-half, 2% milk, 1% milk, skimmed milk, non-fat milk, reconstituted dried crème, reconstituted dried whole milk, reconstituted dried half-and-half, reconstituted dried 2% milk, reconstituted dried 1% milk, reconstituted dried skimmed milk, or reconstituted dried non-fat milk, or a combination thereof.

In another embodiment, a formulation is provided for use in food products, comprising a mixture of about >2.0 wt % to about 30 wt % of one or more stabilizers, wherein at least one stabilizer is a modified food starch gel, about 50 wt % to about 85 wt % of one or more dairy or non-dairy components, and about 10 wt % to about 25 wt % of an amount of one or more sweeteners.

In certain embodiments, the sweeteners of the formulations are liquid sugar, dried sugar, powdered sugar, granular sugar, corn syrup, artificial sweetener or non-nutritive sweetener, or a combination thereof.

In other embodiments, the formulations optionally comprise about 0.1 wt % to about 1.0 wt % of an amount of one or more flavorants. In certain embodiments, the flavorants of the formulations are butterscotch or caramel, or a combination thereof.

In still other embodiments, the formulations optionally comprise about 0.1 wt % to about 1.0 wt % of an amount of one or more colorants. In certain embodiments, the colorants of the formulations are titanium dioxide, caramel, or annatto, or a combination thereof.

According to some embodiments, the formulations are tres leche dessert formulations. In other embodiments, the formulations are in liquid form and are pourable.

In a further embodiment, a dessert product is provided that comprises a cake into which is incorporated a formulation comprising about >2.0 wt % to about 30 wt % of one or more stabilizers, wherein at least one stabilizer is a modified food starch gel, about 50 wt % to about 85 wt % of one or more dairy or non-dairy components, and about 5 wt % to about 30 wt % of an amount of one or more sweeteners. In other embodiments, the dessert product optionally comprises an amount of one or more flavorants or colorants, or a combination thereof. In some embodiments, the dessert products are tres leche desserts.

In one embodiment of the invention, provided is a formulation for use in food products comprising an amount of each of sugar, corn syrup, ButterGel150, cream, whole milk, cellulose gum, modified cellulose, maltodextrin, non-fat dry milk, sodium citrate, salt, sodium phosphate, colorants, and flavorants.

The formulations provided herein are contemplated for use in human or animal food products. The invention provides novel formulations for use in food products, as well as methods of preparing the novel formulations. The invention further provides for the use of the formulations provided herein for the manufacture of food products for humans and animals.

DETAILED DESCRIPTION

Definitions

As used herein, the recited terms have the following meanings. All other terms and phrases used in this specification have their ordinary meanings as one of skill in the art would understand.

References in the specification to "one embodiment", "an embodiment", etc., indicate that the embodiment described may include a particular aspect, feature, structure, moiety, or characteristic, but not every embodiment necessarily includes that aspect, feature, structure, moiety, or characteristic. Moreover, such phrases may, but do not necessarily, refer to the same embodiment referred to in other portions of the specification. Further, when a particular aspect, feature, structure, moiety, or characteristic is described in connection with an embodiment, it is within the knowledge of one skilled in the art to affect or connect such aspect, feature, structure, moiety, or characteristic with other embodiments, whether or not explicitly described.

The singular forms "a," "an," and "the" include plural reference unless the context clearly dictates otherwise. Thus, for example, a reference to "a compound" includes a plurality of such compounds, so that a compound X includes a plurality of compounds X. It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation.

The term "and/or" means any one of the items, any combination of the items, or all of the items with which this term is associated. The phrase "one or more" is readily understood by one of skill in the art, particularly when read in context of its usage. For example, one or more substituents on a phenyl ring refer to one to five, or one to four, for example if the phenyl ring is disubstituted.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values, e.g., weight percents, proximate to the recited range that are equivalent in terms of the functionality of the individual ingredient, the composition, or the embodiment.

As will be understood by the skilled artisan, all numbers, including those expressing quantities of ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range (e.g., weight percents or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, as used in an explicit negative limitation.

An "effective amount" refers to an amount effective to flavor a food product, enhance a food product, or to bring about a recited effect. Determination of an effective amount is well within the capacity of persons skilled in the art, especially in light of the detailed disclosure provided herein. The term "effective amount" is intended to include an amount of a compound or formulation described herein, or an amount of a combination of compounds described herein, e.g., that is effective to provide a pleasing taste to the consumer. Thus, an "effective amount" generally means an amount that provides the desired effect.

The invention provides formulations for use in food products, and in particular, for dessert products. The formulations described herein can be formulated into pourable form, liquid form, semi-solid form, or solid form. In certain embodiments, the formulations of the invention, when used in food products, furnish the creaminess, consistency and the traditional flavor of the many traditional and traditionally made food products, including but not limited to dessert products such as tres leche.

In another embodiment, the formulations are in a simple, ready-to-use form, and do not require laboriously mixing different milks in order to achieve a desired effect. As a non-limiting example, the tres leche formulations described herein provide an enhanced taste, flavor and texture experience to the consumer as compared to the traditional or labor intensive tres leches dessert. In some embodiments, the formulations have provide enhanced organoleptic gratification to the consumer as compared to the traditional or labor intensive tres leches dessert. In certain embodiments, the formulations have reduced protein denaturation as compared to the traditional or labor intensive tres leches desserts. Therefore, the formulations may be heated more aggressively in processing and preparation than traditional or existing tres leches products, and this provides for a superior shelf life for the formulations. In certain other embodiments, the formulations are food products, and they are liquid and pourable.

The present invention provides formulations which do not contain traditional emulsifiers, such as lecithin, polysorbates or mono and di glycerides, and have no need for such emulsifiers to provide the superior structure, texture and flavor that these formulations possess.

In a further embodiment, the formulations provide a base product that can be flavored by one or more flavoring agents and provides one or more nutritional advantages, e.g., that may be formulated to have no animal fat or cholesterol but still maintains comparable levels of protein to those of the dairy equivalents.

In still another embodiment, the formulations provide a single pourable liquid product which may be either dairy or non-dairy, is freezable, is consistent in quality and overall improves the sanitary and keeping quality since only a single liquid is used to prepare the food product, with no exposure to contamination as in the case of mixing three separate milks. In certain embodiments, the liquid product is a dessert product.

It is contemplated that the formulations described herein and variations thereof may be incorporated into various types of food products, including but not limited to dessert cakes and desserts.

The compositions and products can be specifically adapted or modified to create a desired food stuff or an effect, e.g., particular flavor, or the ability to be stored at particular temperature. The formulations may be mixed with certain foods, liquids or flavorings, including but not limited to eggs, spices, cinnamon, coffee, espresso, cappuccino, tea, butterscotch, coconut, nuts, chocolate, and flavored mixes.

The formulations, following their incorporation into cakes, may be further complimented by the addition of fruit or fruit toppings.

Dessert cakes containing the formulations may be prepared by soaking a suitable cake with or immersing a suitable cake in an appropriate amount by weight of the formulation. As a non-limiting example of one embodiment, the dessert cake may be soaked with an amount of the formulation to provide a soaked cake product. Suitable cakes for use with the formulations of the invention include but are not limited to sponge cakes and chiffon cakes. The cakes for use with the formulations of the invention include those made of flour, including but not limited to flours from wheat, corn, coconut, rice, soy, oat, almond, amaranth, barley, buckwheat, chickpea, millet, pumpernickel, quinoa, rye, semolina, pumpernickel, sorghum, spelt, tapioca, and teff, as well as flours such as cake, self-rising, all purpose, bread, and whole wheat. The cakes and desserts for use with the formulations of the invention may include those that are gluten-free or tree-nut free.

The formulations may be manufactured and/or packaged in group, single or multiple portions or servings. The formulations may be frozen, stored, distributed, and thawed for subsequent consumption.

The formulations may be prepared by conventional methods, including but not limited to regular pasteurization (LTLT, HTST), Extended Shelf Life (ESL), Ultra High Temperature (UHT) and in-container sterilization or any other effective means to achieve microbial control and preservation of the formulations.

The formulations of the invention are for consumption by humans or animals.

As used herein, "tres leche," refers to the flavor or flavor experience of a tres leche dessert, including but not limited to a tres leches cake or a tres leches tort. The tres leche dessert refers to a type of dessert that is like a sponge cake or a butter cake that has been soaked in three kinds of milk—evaporated milk, condensed milk, and heavy cream.

As used herein, milk is the lacteal secretion, practically free from colostrum, obtained by the complete milking of one or more healthy cows. Milk that is in final package form for beverage use shall have been pasteurized or ultra-pasteurized, and shall contain not less than 8¼% milk solids not fat and not less than 3¼% milk fats. Milk may have been adjusted by separating part of the milk fat therefrom, or by adding thereto ingredients such as cream, concentrated milk, dry whole milk, skim milk, concentrated skim milk, or nonfat dry milk. As used herein, the term "milk" may be cream, crème, whole milk, 2% milk, 1% milk, skimmed milk, non-fat milk or the dried form of any of the preceding. Milk may be homogenized or non-homogenized. Whole milk, as used herein, refers to milk containing about 4% butterfat. As used herein, cream, heavy cream, or crème, refers to the yellowish part of milk, which typically contains from 18 to about 42 percent butterfat. As used herein, "evaporated milk" or dehydrated milk is a shelf-stable canned milk product with about 50-60% of the water removed from milk. It differs from sweetened condensed milk, which contains added sugar. As used herein, "condensed milk" refers milk from which water has been removed. It is most often found in the form of sweetened condensed milk (SCM), with sugar added, and the two terms "condensed milk" and "sweetened condensed milk" may be used synonymously.

As used herein, modified food starch is comprised of hydrocolloid starch and stabilizer, where hydrated modified food starch gel is comprised of approximately 16-24% solids. The modified food starch may be used as a prehydrated gel or as a dried hydrocolloid for hydration in situ. In certain embodiments, hydrated modified food starch gel is used. In other embodiments, a dried modified food starch is used. When dried modified food starch is hydrated with water, the result is hydrated modified food starch gel. When dried modified food starch is used in the formulations, an amount water is used to hydrate the dried modified food starch prior to adding to the formulation, such that when the dried modified food starch is hydrated, it is comprised of approximately 16-24% solids. Alternately, when dried modified food starch is used in the formulations, water is added to the formulation in an amount sufficient to hydrate the dried modified food starch and so that the modified food starch in the formulation is comprised of approximately 16-24% solids. Various embodiments of modified food starch are described in U.S. Pat. No. 7,550,279. As used herein, "ButterGel150" or "ButterGel100" refers to any of the compositions, modified starches, host molecules, clathrates, butter-like gels, and stabilized amyloses described in U.S. Pat. No. 7,550,279 (issued Jun. 23, 2009). U.S. Pat. No. 7,550,279 is incorporated herein by reference in its entirety.

The '279 patent describes a preferred embodiment "directed to a method of producing stabilized, meltable, hydrophilic, starch derived amylose and amylopectin host molecules capable of forming guest/host complexes with hydrophobic compounds comprising the steps of: (A) slurrying starch in water in the presence of a base; (B) cooling the slurry to a temperature below ambient; (C) at least partially esterifying the starch by adding an esterifying agent at a pH above neutral and a temperature below ambient; (D) allowing the pH to drop below neutral; (E) diluting and washing the starch slurry; (F) hydrating the washed starch by heating; (G) dissolving the hydrated starch in water and heating; (H) cooling the starch to a temperature suitable for alpha amylase introduction; (I) adding alpha amylase and holding until a pre-determined desired viscosity is attained; and (J) heating to 92° C. to 105° C. to inactivate the enzyme." (see col. 10, lines 25-43). Claim 1 of the '279 patent describes "a method for producing an amylose starch composition the hydrated modified food starch gel is prepared by a process comprising the steps of:

(A) stirring for at least 3 hours a slurry of about 35 percent solids of starch, the starch having a C-type crystallinity, in water at a temperature from about 20° C. to about 48° C. with a sufficient concentration of a base to obtain a pH of about 10;

(B) cooling the slurry to a temperature between about 10° C. and 15° C.;

(C) adding an esterification agent while maintaining a pH of about 8.3 and a temperature from about 10° C. and about 15° C. until a degree of substitution from about 0.08 to about 0.15 is obtained;

(D) washing the starch with water to remove salts of the esterification agent;

(E) diluting the starch, while adjusting the pH to about 5.8, to obtain a solids slurry of about 20 percent;

(F) heating the slurry to a temperature from about 82° C. to about 105° C. for about 2 to about 5 minutes;

(G) cooling the slurry to between about 50° C. to about 85° C.;

(H) adding from 1.8 to 10 grams per 770 pounds of starch of a 1,4-alpha-D-glucan glucano-hydrolase to treat the slurry;

(I) holding the 1,4-alpha-D-glucan glucano-hydrolase in the slurry between about 50° C. and about 85° C. until a desired, lower viscosity is attained;

(J) heating the slurry to 92° C. to 105° C. to inactivate the 1,4-alpha-D-glucan glucano- hydrolase; and (K) cooling the slurry to form a gel, the gel contains sufficient stabilized amylose molecules in a helical configuration to render the gel thermo-reversible."

The '279 patent further describes embodiments of the method "wherein the starch is a member selected from the group consisting of pea starch lentil starch, and mung bean starch" (claim 2) and acetic anhydride esterification until "enough acetyl groups have been formed to produce a DS of 0.08 to 0.15" (col. 16, lines 61-62).

Where traditional emulsifying stabilizers act in a preparation by emulsifying oil in small discrete droplets. However, modified food starch, such a hydrated modified food starch gel, encapsulates fat molecules to produce minor molecular dispersions. Thus, modified food starch is a stabilizer that is a molecule dispersion agent. In embodiments of the formulations, modified food starch is a stabilizer that is a molecule dispersion agent in the formulations.

As used herein, sodium citrate refers to a food-grade sodium citrate, including but not limited to trisodium citrate ($Na_3C_6H_5O_7$). In certain embodiments, sodium citrate acts as a protein modifier in the present formulations.

As used herein, sodium phosphate refers to a food-grade sodium phosphate, including but not limited to, disodium phosphate and tetrasodium pyrophosphate ($Na_4P_2O_7$ (crystalline form) or $Na_4P_2O_7.10(H_2O)$ (hydrated form)). In certain embodiments, sodium phosphate acts as a protein modifier in the present formulations.

As used herein, maltodextrin is a polysaccharide comprised of starch hydrolysates, and, as a non-limiting example of its function in food products, maltodextrin can be a source of complex carbohydrates, a hydrocolloid, a stabilizer, a carrier and a bulking agent. As a non-limiting example, commercially available Maltrin 180 (Grain Processing Corp, USA) may be used as the maltodextrin in embodiments of the formulations.

As used herein, stabilizers are used in the formulations. Modified food starch, such as hydrated modified food starch gel, is a stabilizer that is suitable for use in the formulations. In addition, other stabilizers suitable for use in the formulations include, but are not limited to, carboxymethyl cellulose, cellulose gum, methyl cellulose, carrageenan and maltodextrin. As used herein, maltodextrin is a polysaccharide comprised of starch hydrolysates.

As used herein, disodium phosphate duohydrate is a crystalline product that is essentially odorless. It acts as a buffer and a mineral support, and an agent useful for uniform texture and smoothness in food compositions and food products.

As used herein, the terms "colorant," "color," "color additive," "artificial colors," and "natural colors" refer to dyes, pigments, or other substances that can impart color to a food. In certain embodiments, the terms may be used interchangeably. Colorants are important components of many products, making them attractive, appealing, appetizing, and informative. Added color serves as a kind of code that allows consumers to identify products on sight, like candy or dessert flavors. Non-limiting examples of colorants that may be used in embodiments are titanium dioxide, caramel color or annatto color.

As used herein, sweetener refers to a material that provides the pleasant taste characteristic of sugar or honey; not salty, sour, or bitter. In certain embodiments, sugar is used as a sweetener. Sugar refers to a sweet crystallizable material that can consist wholly or essentially of sucrose, is colorless or white when pure, and tending to brown when less refined, is obtained commercially from sugarcane or sugar beet and less extensively from sorghum, maples, and palms, and is important as a source of dietary carbohydrate and as a sweetener and preservative of other foods; sugar also refers to any of various water-soluble compounds that vary widely in sweetness, include the monosaccharides and oligosaccharides, and typically are optically active. In some embodiments, the formulations may contain an amount of liquid sugar or a sucrose solution. In other embodiments, the formulations may contain an amount of sugar in a solid or powdered or granular form. As used herein, corn syrup is syrup made from corn starch, containing maltose and various saccharides such as oligosaccharides, depending on the grade. In certain embodiments of the formulations, corn syrup acts as sweetener. In certain embodiments, artificial or non-nutritive sweeteners are used.

As used herein, "flavorant" refers to a substance that gives a food product flavor or contributes to the flavor of the food product. Flavorants can be artificial flavors or natural flavors, or a combination thereof.

As used herein, "natural flavoring" refers to an essential oil, oleoresin, essence or extractive, protein hydrolysate, distillate, or any product of roasting, heating or enzymatic lysis, which contains the flavoring constituents derived from a spice, fruit or fruit juice, vegetable or vegetable juice, edible yeast, herb, bark, bud, root, leaf or similar plant material, poultry, eggs, dairy products, or fermentation products thereof, whose significant function in food is flavoring rather than nutritional. As used herein, caramel flavor acts as a flavoring agent, and can be an artificial flavor or a natural flavor, depending on the desired characteristics of the food product. Similarly, as used herein, butterscotch flavor acts as a flavoring agent, and can be an artificial flavor or a natural flavor, depending on the desired characteristics of the food product.

As used herein, "artificial flavor" or "artificial flavoring" refers to any substance, the function of which is to impart flavor, which is not derived from a natural product. Thus an artificial flavor would not be derived from natural items such as a spice, fruit or fruit juice, vegetable or vegetable juice, edible yeast, herb, bark, bud, root, leaf or similar plant material, meat, fish, poultry, eggs, dairy products, or fermentation products thereof.

As used herein, "flavor enhancer" refers to edible compounds, chemicals and extracts that alter the flavor of a food in a sensory pleasing manner. As a non-limiting example, salt has the chemical formula NaCl, and may act as a flavor enhancer. In another non-limiting example, salt replacer may be used in the formulations and is a commercially available flavor enhancer.

In one embodiment, the formulation is comprised of at least 2 dairy products, stabilizers, where at least one stabilizer is a hydrated modified food starch gel, and one or more sweeteners. Optionally, the formulations may contain one or more natural and artificial flavors. Optionally, the formulations may contain one or more coloring agents or colorants.

In certain embodiments, the amount of the dairy or non-dairy component of the formulations described herein may be preferably about 25 weight % to about 95 weight % of the product, preferably about 45 weight % to about 90 weight %, preferably about 50 weight % to about 85 weight % of the product. Non-limiting examples of dairy or non-dairy components include cream, whole milk, half-and-half, 2% milk, 1% milk, non-fat milk, skim milk, dried cream, dried whole milk, dried half-and-half, dried 2% milk, dried 1% milk, dried non-fat milk, dried skim milk, whey protein, caseinate, milk protein concentrate and milk protein isolate; examples of non-dairy protein sources include but are not limited to vegetable protein components. In certain embodiments, preferred dairy components include crème, cream, whole milk, skim milk, and non-fat dried milk.

In certain embodiments, the amount of modified food starch, as a stabilizer, of the formulations described herein may be preferably about >2.0 weight % to about 40 weight % of the product, preferably about >2.0 weight % to about 30 weight %, preferably about 5 weight % to about 20 weight % of the product. In certain embodiments, the amount of stabilizers other than the hydrated modified food starch gels in the formulations may be preferably about 0.005 weight % to about 10 weight % of the product, or preferably about 0.05 weight % to about 5 weight % of the product, or preferably about 0.1 weight % to about 1.0 weight % of the product. Examples of stabilizers other than the hydrated modified food starch gels include but are not limited to carboxymethyl cellulose, methylcellulose, maltodextrin, and cellulose gum or similar stabilizers.

In certain embodiments, the crème or cream component of the formulations of the invention may be preferably about 0.5 weight % to about 25 weight % of the product, preferably about 1.0 weight % to about 10 weight %, or preferably about 2.5 weight % to about 7.5 weight % of the product.

In certain embodiments, the whole milk component of the formulations as described herein may be preferably about 25 weight % to about 80 weight % of the product, preferably about 35 weight % to about 70 weight %, or preferably about 45 weight % to about 65 weight % of the product.

In certain embodiments, the non-fat dry milk component of the formulations as described herein may be preferably about 0.005 weight % to about 20 weight % of the product, preferably about 0.05 weight % to about 10 weight %, or preferably about 0.5 weight % to about 5 weight % of the product.

In certain embodiments, the skim milk component of the formulations as described herein may be preferably about 0.005 weight % to about 20 weight % of the product, preferably about 0.05 weight % to about 10 weight %, or preferably about 0.5 weight % to about 5 weight % of the product.

In certain embodiments, the amount of the sugar and sweetener components of the formulations as described herein may be preferably about 5 weight % to about 65 weight % of the product, or preferably about 10 weight % to about 45 weight % of the product, or preferably about 15 weight % to about 30 weight % of the product. Examples of sweetener components include, but are not limited to, cane sugar, beet sugar, brown sugar, white sugar, corn syrup, sucrose, sugar substitutes, honey, molasses, golden syrup, and treacle, as well as non-nutritive and artificial sweeteners, and including liquid, dried, powdered and granular versions of the same.

In certain embodiments, the amount of sugar of the formulations as described herein may be preferably about 5 weight % to about 50 weight % of the product, preferably about 10 weight % to about 30 weight % of the product, or preferably about 12.5 weight % to about 25 weight % of the product.

In certain embodiments, the amount of corn syrup used in the formulations as described herein may be preferably about 0.5 weight % to about 30 weight % of the product, preferably about 1.5 weight % to about 20 weight % of the product, or preferably about 3.5 weight % to about 15 weight % of the product.

In certain embodiments, the amount of salt used in the formulations as described herein may be preferably about 0.0005 weight % to about 10 weight % of the product, preferably about 0.005 weight % to about 5 weight % of the product, or preferably about 0.05 weight % to about 1.0 weight % of the product.

In certain embodiments, the amount of trisodium citrate used in the formulations as described herein may be preferably about 0.0005 weight % to about 10 weight % of the product, preferably about 0.005 weight % to about 5 weight % of the product, or preferably about 0.05 weight % to about 1.0 weight % of the product.

In certain embodiments, the amount of titanium dioxide used in the formulations as described herein may be preferably about 0.0005 weight % to about 10 weight % of the product, preferably about 0.005 weight % to about 5 weight % of the product, or preferably about 0.05 weight % to about 1.0 weight % of the product.

In certain embodiments, the amount of salt replacer used in the formulations as described herein may be preferably about 0.0005 weight % to about 10 weight % of the product, preferably about 0.005 weight % to about 5 weight % of the product, or preferably about 0.001 weight % to about 1.0 weight % of the product.

In certain embodiments, the amount of flavor used in the formulations as described herein may be preferably about 0.005 weight % to about 10 weight % of the product, preferably about 0.005 weight % to about 5 weight % of the product, or preferably about 0.05 weight % to about 2.5 weight % of the product. In certain embodiments, the flavor is optionally added to the formulations, and may be caramel or butterscotch flavor.

In certain embodiments, the amount of colorant used in the formulations as described herein may be preferably about 0.005 weight % to about 10 weight % of the product, preferably about 0.005 weight % to about 5 weight % of the product, or preferably about 0.002 weight % to about 2.0 weight % of the product.

The following Examples are intended to illustrate the above invention and should not be construed as to narrow its scope. One skilled in the art will readily recognize that the Examples suggest many other ways in which the invention could be practiced. It should be understood that numerous variations and modifications may be made while remaining within the scope as described herein.

EXAMPLES

Example 1

The following tres leche formulation was made as follows: Liquid sugar and corn syrup were mixed together, and to the sugar mix, ButterGel150 stabilizer was added. These ingredients were mixed together thoroughly. To the mixture, amounts of cream and whole milk were added. Next, an additional amount of whole milk was added, and at the same time, an amount of carboxymethycellulose and methylcellulose (as stabilizers) were added to the mixture. After a thorough mixing, the following ingredients were added: maltodextrin (stabilizer), non-fat dry milk, trisodium citrate, salt, disodium phosphate duohydrate, colorings and flavorings. The ingredients were well mixed, and then additional color was slowly added to the mixture. The resulting product is one example of a tres leche formulation.

Example 2

The following is an example of one embodiment of the formulation of a tres leche product.

TABLE 1

| Ingredient | PCT of Total Product |
|---|---|
| Sugar, liquid | 17.43% |
| Corn Syrup | 6.87% |
| ButterGel 150 | 10.00% |
| Cream | 4.88% |
| Milk, Whole | 32.25% |
| Milk, Whole | 24.38% |
| carboxymethylcellulose | 0.30% |
| methylcellulose | 0.12% |
| Maltodextrin | 1.94% |
| Non Fat Dry Milk | 1.10% |
| Trisodium Citrate | 0.11% |
| Salt | 0.10% |
| Disodium Phosphate Duo | 0.10% |
| Titanium Dioxide | 0.02% |
| Salt Replacer | 0.01% |
| Caramel Flavor | 0.31% |
| Butterscotch Flavor | 0.07% |
| Annatto Color | 0.01% |
| Total | 100% |

Example 3

The analysis of fat, protein and water content was done for the formulation provided in Example 2, above.

TABLE 2

| | Analyses | | | Final Make-up | | |
|---|---|---|---|---|---|---|
| Ingredient | Fat | Protein | Water | Fat | Protein | Moisture |
| Sugar, liquid | 0.0% | 0.0% | 35.0% | 0.0% | 0.0% | 6.1% |
| Corn Syrup | 0.0% | 0.0% | 19.5% | 0.0% | 0.0% | 1.3% |
| ButterGel 150 | 0.0% | 0.0% | 80.0% | 0.0% | 0.0% | 8.0% |
| Cream | 40.0% | 2.5% | 55.4% | 2.0% | 0.1% | 2.7% |
| Milk, Whole | 3.5% | 3.3% | 87.8% | 1.1% | 1.0% | 28.3% |
| Milk, Whole | 3.5% | 3.3% | 87.8% | 0.9% | 0.8% | 21.4% |
| carboxymethycellulose | 0.0% | 0.0% | 1.0% | 0.0% | 0.0% | 0.0% |
| methylcellulose | 0.0% | 0.0% | 4.0% | 0.0% | 0.0% | 0.0% |
| Maltodextrin | 0.0% | 0.0% | 4.0% | 0.0% | 0.0% | 0.1% |
| Non Fat Dry Milk | 1.0% | 35.0% | 3.0% | 0.0% | 0.4% | 0.0% |
| Trisodium Citrate | 0.0% | 0.0% | 0.0% | 0.0% | 0.0% | 0.0% |
| Salt | 0.0% | 0.0% | 2.0% | 0.0% | 0.0% | 0.0% |
| Disodium Phosphate Duo | 0.0% | 0.0% | 1.0% | 0.0% | 0.0% | 0.0% |
| Titanium Dioxide | 0.0% | 0.0% | 0.0% | 0.0% | 0.0% | 0.0% |
| Salt Replacer | 10.0% | 10.0% | 4.0% | 0.0% | 0.0% | 0.0% |
| Caramel Flavor | 0.0% | 3.0% | 97.0% | 0.0% | 0.0% | 0.3% |
| Butterscotch Flavor | 0.0% | 3.0% | 97.0% | 0.0% | 0.0% | 0.1% |
| Annatto Color | 0.0% | 0.0% | 50.0% | 0.0% | 0.0% | 0.0% |
| | | | | 3.9% | 2.4% | 68.4% |

Example 4

This example provides a further example of an embodiment of a formulation.

TABLE 3

| Ingredient | Net Lbs | Ratio |
|---|---|---|
| milk | 9,838.40 | 70.506% |
| Liquid Sugar | 1,779.10 | 12.750% |

TABLE 3-continued

| Ingredient | Net Lbs | Ratio |
| --- | --- | --- |
| hydrated fortified food starch gel | 943.00 | 6.758% |
| corn syrup | 708.00 | 5.074% |
| cream | 480.20 | 3.441% |
| skim milk | 0.00 | 0.000% |
| maltodextrin | 99.10 | 0.710% |
| natural and artificial flavors | 32.20 | 0.231% |
| modified cellulose | 17.90 | 0.128% |
| Sodium Citrate | 11.20 | 0.080% |
| Sodium phosphate | 10.50 | 0.075% |
| salt | 10.00 | 0.072% |
| cellulose gum | 9.10 | 0.065% |
| natural and artificial flavors | 7.60 | 0.054% |
| carrageenan | 3.30 | 0.024% |
| color | 1.60 | 0.011% |
| natural and artificial flavors | 1.50 | 0.011% |
| color | 1.30 | 0.009% |
| non-fat dry milk | 0.00 | 0.000% |
| water | 0.00 | 0.000% |

Example 5

The following table provides a non-limiting listing of ingredients for certain embodiments of the formulations and non-limiting examples of ranges of said ingredients in said embodiments of the formulations.

TABLE 4

| Ingredient | Percent Range |
| --- | --- |
| Milk | 40-75% |
| Sweetener | 10-15% |
| Hydrated modified food starch gel | 4-10% |
| Sweetener | 2.5-10% |
| Cream | 1-10% |
| Skim Milk | 0.00-10% |
| Maltodextrin | 0.2-5% |
| Natural and artificial flavors | 0.05-1.0% |
| Modified Cellulose | 0.05-0.5% |
| Sodium Citrate | 0.01-0.5% |
| Sodium Phosphate | 0.01-0.5% |
| Salt | 0.01-0.5% |
| Cellulose Gum | 0.01-0.5% |
| Natural and artificial flavors | 0.01-0.5% |
| Carageenan | 0.01-0.5% |
| Color | 0.005-0.05% |
| Natural and artificial flavors | 0.005-0.05% |
| Color | 0.0005-0.5% |
| Non fat dry milk | 0.00-5% |
| Water | 0.00-20% |

Formulations such as those described herein, and variations thereof, may be prepared by conventional procedures well known in the consumer food art. It will be appreciated that the above formulations may be varied according to well-known food preparation and food technology techniques to accommodate differing amounts and types of active ingredient, as well as desired consumer experience. Additionally, the specific ingredients and proportions are for illustrative purposes. Ingredients may be exchanged for suitable equivalents and proportions may be varied, according to the desired properties of the formulation of interest.

While specific embodiments have been described above with reference to the disclosed embodiments and examples, such embodiments are only illustrative and do not limit the scope of the invention. Changes and modifications can be made in accordance with ordinary skill in the art without departing from the invention in its broader aspects as defined in the following claims.

All publications, patents, and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

What is claimed is:

1. A tres leches dessert formulation, consisting of a mixture of:
    about 4 wt % to about 10 wt % hydrated modified food starch gel, wherein the hydrated modified food starch gel contains stabilized, meltable, hydrophilic, starch derived amylose and amylopectin host molecules capable of forming guest/host complexes with hydrophobic compounds, and sufficient stabilized amylose molecules in a helical configuration to render the gel thermo-reversible;
    0.2 wt % to 5 wt % Maltodextrin;
    0.05 wt % to 0.5 wt % Modified Cellulose;
    0.01 wt % to 0.5 wt % Cellulose Gum;
    0.01 wt % to 0.5% wt % Carrageenan;
    2.5 wt % to 7.5 wt % cream;
    56 wt % to 75 wt % whole milk;
    0 or 0.005 to 1.1 wt % non fat dry milk;
    a combination of 0.01-0.5% by weight sodium chloride, 0.01-0.5% by weight of a citrate salt selected from sodium citrate and trisodium citrate, and 0.01-0.5% by weight of a phosphate salt selected from sodium phosphate and disodium phosphate duohydrate; and
    10 wt % to 15 wt % of a first sweetener;
    2.5 wt % to 10 wt % of a second sweetener;
    0.00 wt % to about 10 wt % skim Milk;
    0.05 wt % to 1.0 wt % of at least one flavor;
    0.005 wt % to 0.05 wt % of a first color;
    0.0 wt % to 0.5 wt % of a second color; and
    0.00 wt % to 20 wt % by weight water,
    wherein the percentages are based on the total weight of the formulation, wherein the formulation is in liquid form and is pourable.

2. The formulation of claim 1, wherein the hydrated modified food starch gel consists of about 16-24% solids.

3. The formulation of claim 1, wherein the first sweetener or the second sweetener is liquid sugar, dried sugar, powdered sugar, granular sugar, corn syrup, artificial sweetener or non-nutritive sweetener, or a combination thereof, wherein the first sweetener is different than the second sweetener.

4. The formulation of claim 1, wherein the at least one flavor is butterscotch, caramel, or a combination thereof.

5. The formulation of claim 1, wherein the first color or the second color is titanium dioxide, caramel, or annatto, or a combination thereof.

6. A pourable tres leches formulation made by a process consisting of:

mixing a sweetener and a hydrated modified food starch gel to form a first mixture, wherein the hydrated modified food starch gel contains stabilized, meltable, hydrophilic, starch derived amylose and amylopectin host molecules capable of forming guest/host complexes with hydrophobic compounds, and sufficient stabilized amylose molecules in a helical configuration to render the gel thermo-reversible;

adding cream and a first portion of whole milk to the first mixture to form a second mixture;

adding a second portion of whole milk and a first stabilizer to the second mixture to form a third mixture;

adding a second stabilizer, a protein modifier, a flavoring, a colorant, and optionally dry non fat dry milk, to form a fourth mixture;

wherein the fourth mixture consists of:

about 4 wt % to about 10 wt % hydrated modified food starch gel;

10 wt % to 15 wt % of a first sweetener;

2.5 wt % to 10 wt % of a second sweetener;

0.2 wt % to 5 wt % Maltodextrin;

0.05 wt % to 0.5 wt % Modified Cellulose;

0.01 wt % to 0.5 wt % Cellulose Gum;

0.01 wt % to 0.5 wt % Carrageenan;

2.5 wt % to 07.5 wt % cream;

56 wt % to about 75 wt % whole milk;

a combination of 0.01-0.5% by weight sodium chloride, 0.01-0.5% by weight of a citrate salt selected from sodium citrate and trisodium citrate, and 0.01-0.5% by weight of a phosphate salt selected from sodium phosphate and disodium phosphate duohydrate;

0.05 wt % to 1.0 wt % of at least one flavor;

0.005 wt % to 0.05 wt % of a first color;

0.0 wt % to 0.5 wt % of a second color; and 0.00 wt % to 20 wt % by weight water; and 0.00 to 5 wt % non fat dry milk.

7. The tres leches formulation of claim 1, consisting of:
17.43% Liquid Sugar;
6.87% Corn Syrup;
10.00% Hydrated Modified Food Starch Gel;
4.88% Cream;
56.63% Whole Milk;
0.30% Carboxymethylcellulose;
0.12% Methylcellulose;
1.94% Maltodextrin;
1.10% Non Fat Dry Milk;
0.11% Trisodium Citrate;
0.10% Sodium Chloride;
0.10% Disodium Phosphate Duohydrate;
0.02% Titanium Dioxide;
0.01% Salt Replacer;
0.31% Caramel Flavor;
0.07% Butterscotch Flavor; and
0.01% Annatto Color, wherein the percentages are based on the total weight of the formulation.

8. The tres leches formulation of claim 1, consisting of:
70.506% Whole Milk;
12.75% Liquid Sugar;
6.758% Hydrated Modified Food Starch Gel;
5.074% Corn Syrup;
3.441% Cream;
0.711% Maltodextrin;
0.231 first Natural and Artificial Flavors;
0.054 second Natural and Artificial Flavors;
0.011 third Natural and Artificial Flavors;
0.128% Modified Cellulose;
0.080% Sodium Citrate;
0.075% Sodium Phosphate;
0.072% Salt;
0.011% first Color;
0.009% second Color;
0.065% Cellulose Gum; and
0.024% Carrageenan, wherein the percentages are based on the total weight of the formulation.

* * * * *